United States Patent
Tally et al.

(10) Patent No.: US 10,543,146 B2
(45) Date of Patent: Jan. 28, 2020

(54) PORTABLE OSCILLATING COMPRESSION SYSTEM

(71) Applicant: Renew Group Private Limited, Farmington Hills, MI (US)

(72) Inventors: William N Tally, Milford, MI (US); Roy Carl Burmeister, Jr., Davisburg, MI (US); Kevin Francis Moran, Farmington Hills, MI (US)

(73) Assignee: Renew Group Private Limited, Singapore (SG)

( * ) Notice: Subject to any disclaimer, the term of this patent is extended or adjusted under 35 U.S.C. 154(b) by 1059 days.

(21) Appl. No.: 14/780,031

(22) PCT Filed: Mar. 27, 2014

(86) PCT No.: PCT/IB2014/001670
§ 371 (c)(1),
(2) Date: Sep. 25, 2015

(87) PCT Pub. No.: WO2014/184667
PCT Pub. Date: Nov. 20, 2014

(65) Prior Publication Data
US 2016/0045390 A1    Feb. 18, 2016

Related U.S. Application Data

(60) Provisional application No. 61/865,227, filed on Aug. 13, 2013, provisional application No. 61/805,554, filed on Mar. 27, 2013.

(51) Int. Cl.
*A61H 9/00* (2006.01)
*F16K 31/06* (2006.01)
*G05D 7/06* (2006.01)

(52) U.S. Cl.
CPC ......... *A61H 9/0092* (2013.01); *A61H 9/0007* (2013.01); *F16K 31/0644* (2013.01); *G05D 7/0641* (2013.01); *A61H 2201/1238* (2013.01)

(58) Field of Classification Search
CPC ...... A61H 9/0078; A61H 9/0092; A61H 9/00; A61H 9/005; F16K 11/0743; F16K 11/10;
(Continued)

(56) References Cited

U.S. PATENT DOCUMENTS 3,294,120 A * 12/1966 Ruchser .............. F15B 13/0405
                                                   137/596.16
3,866,604 A *  2/1975 Curless ................ A61H 9/0078
                                                   601/152

(Continued)

FOREIGN PATENT DOCUMENTS

| CN | 2030082 U | 1/1989 |
| CN | 1535129 A | 10/2004 |

(Continued)

OTHER PUBLICATIONS

Extended European Search Report for European Patent Application 14798359.7, dated Feb. 22, 2017.
(Continued)

*Primary Examiner* — Michael J Tsai
(74) *Attorney, Agent, or Firm* — Oakland Law Group PLLC

(57) ABSTRACT

A portable oscillating compression system including an for compressing air; an accumulator tank for receiving and storing the compressed air from the air compressor; an air pressure adjustment module for modulating pressure of the compressed air when the compressed air exits the accumulator tank; a valve body assembly attached to the accumulator tank, a plurality of inflatable cuffs connected to the valve body assemble for receiving the compressed air from
(Continued)

the valve body assembly; a controller for controlling the valve body assembly; a power supply; and a housing for containing said system.

7 Claims, 14 Drawing Sheets

(58) Field of Classification Search
CPC ............... F15B 13/081; F15B 13/0814; F15B 13/0817; F15B 13/0821; F15B 13/0825
USPC .................................. 251/366, 367; 137/885
See application file for complete search history.

(56) References Cited

U.S. PATENT DOCUMENTS

| | | | | |
|---|---|---|---|---|
| 3,955,563 | A * | 5/1976 | Maione | A61H 23/04 601/106 |
| 4,570,676 | A * | 2/1986 | Nishio | A47C 7/467 137/870 |
| 5,383,894 | A * | 1/1995 | Dye | A61H 9/0078 606/201 |
| 5,806,512 | A * | 9/1998 | Abramov | A61H 9/0078 128/204.18 |
| 5,996,369 | A * | 12/1999 | Hirota | B60H 1/00878 137/597 |
| 6,355,008 | B1 * | 3/2002 | Nakao | A61H 9/0078 601/149 |
| 6,629,941 | B1 * | 10/2003 | Ishibashi | A61H 9/0078 601/152 |
| 6,694,809 | B2 * | 2/2004 | Porter | B01F 3/022 73/202 |
| 6,846,294 | B2 | 1/2005 | Rastegar et al. | |
| 6,858,012 | B2 | 2/2005 | Burns et al. | |
| 6,904,895 | B1 * | 6/2005 | Moreno | F01L 1/24 123/198 F |
| 7,258,676 | B2 | 8/2007 | Calderon | |
| 7,314,478 | B2 | 1/2008 | Hui | |
| 7,981,066 | B2 | 7/2011 | Lewis | |
| 8,142,343 | B2 | 3/2012 | Pickett et al. | |
| 8,197,416 | B1 | 6/2012 | Shankar | |
| 8,579,792 | B2 | 11/2013 | Picket et al. | |
| 8,956,387 | B2 | 2/2015 | Naghavi et al. | |
| 2002/0038671 | A1 * | 4/2002 | Johnson | F16K 27/003 137/884 |
| 2002/0099409 | A1 | 7/2002 | Hui | |
| 2003/0193187 | A1 * | 10/2003 | Takada | F16L 37/144 285/120.1 |
| 2003/0226527 | A1 * | 12/2003 | Herbert | F15B 13/0814 123/90.13 |
| 2003/0226606 | A1 * | 12/2003 | Hayashi | F15B 13/0814 137/884 |
| 2004/0089837 | A1 * | 5/2004 | Bauer | F15B 13/081 251/367 |
| 2005/0111996 | A1 | 5/2005 | Ma et al. | |
| 2006/0004245 | A1 | 1/2006 | Pickett et al. | |
| 2006/0058716 | A1 * | 3/2006 | Hui | A61H 9/0078 601/152 |
| 2006/0060254 | A1 * | 3/2006 | Silva | F16K 11/022 137/885 |
| 2006/0111641 | A1 | 5/2006 | Manera et al. | |
| 2006/0116615 | A1 | 6/2006 | Zheng et al. | |
| 2008/0033228 | A1 | 2/2008 | Rastegar | |
| 2008/0228026 | A1 | 9/2008 | Manera et al. | |
| 2008/0242916 | A1 | 10/2008 | Avni | |
| 2009/0112151 | A1 * | 4/2009 | Chapman | A61M 1/28 604/29 |
| 2009/0114865 | A1 * | 5/2009 | Homann | B60T 8/3675 251/129.15 |
| 2009/0137884 | A1 | 5/2009 | Pickett et al. | |
| 2011/0220822 | A1 * | 9/2011 | Bento | F15B 20/001 251/129.15 |
| 2011/0270112 | A1 | 11/2011 | Manera et al. | |
| 2013/0340619 | A1 * | 12/2013 | Tammera | F16K 11/00 96/121 |
| 2015/0141887 | A1 * | 5/2015 | Kawashima | A61H 9/0078 601/149 |

FOREIGN PATENT DOCUMENTS

| | | |
|---|---|---|
| CN | 26949684 Y | 4/2005 |
| GB | 2239930 | 7/1991 |
| WO | WO2003024315 | 3/2003 |

OTHER PUBLICATIONS

International Report on Patentability for PCT/IB2014/001670, dated Sep. 29, 2015.
Extended European Search Report, Application No. 18187315.9, dated Nov. 20, 2018.

* cited by examiner

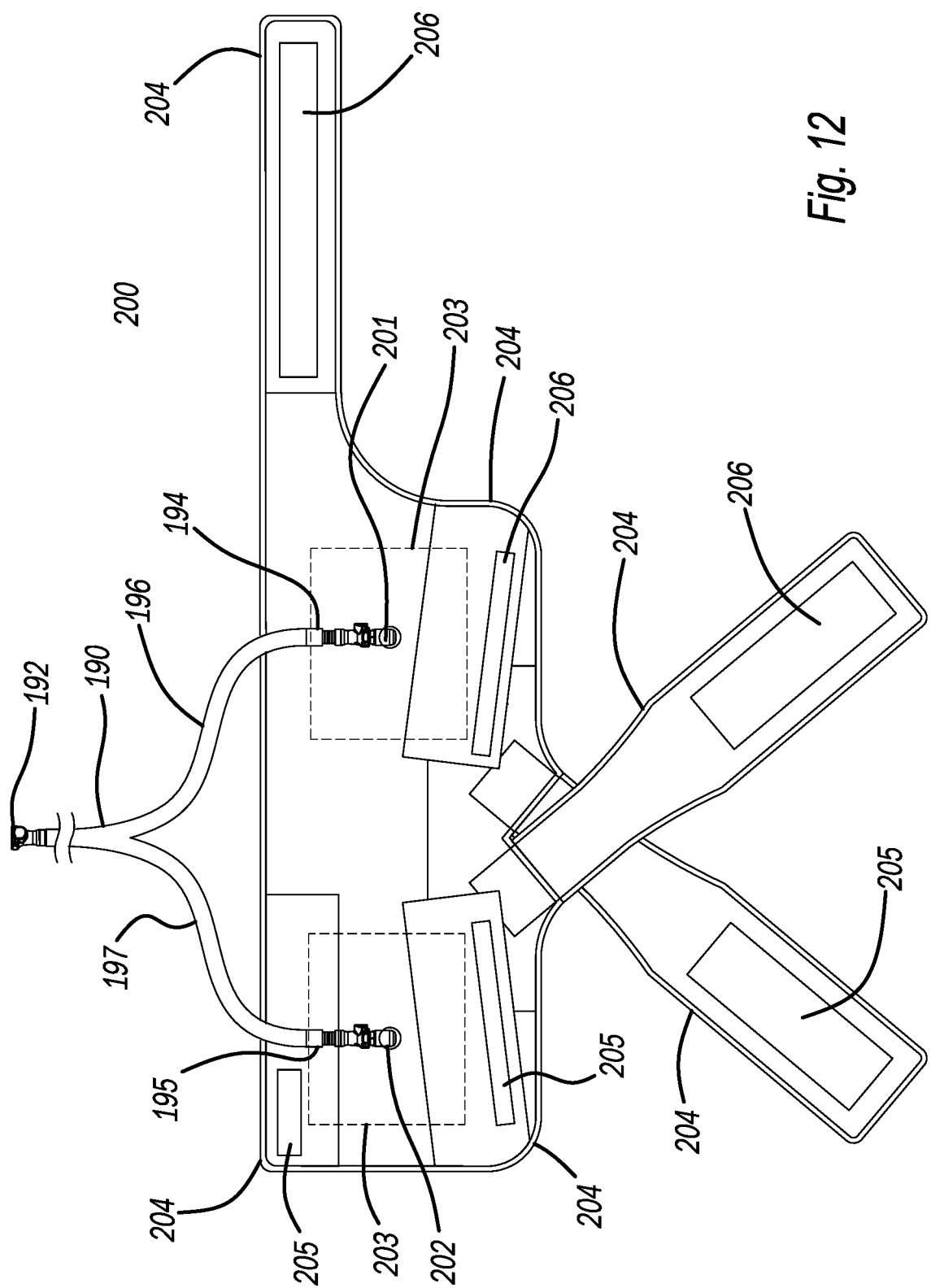

PORTABLE OSCILLATING COMPRESSION SYSTEM

BACKGROUND OF THE INVENTION

1. Field of the Invention

Generally, the present relates to devices for use in improving blood circulation. More specifically, the present invention relates to a portable external counter pulsation device.

2. Description of the Related Art

Clinical external counter pulsation therapy (ECP) was developed to improve a human cardiovascular system (under operational control of a health care professional). The clinical ECP system is very large, not very portable and is also prohibitively expensive for home use, with systems retailing for thousands of dollars. Even if such a system were affordable, its sheer size makes usage in a home environment very difficult.

External counter pulsation (ECP) has been introduced during the last 3 decades as a non-invasive alternative approach to active physical exercise in patients suffering from severe coronary artery disease (CAD). Several prospective clinical trials have demonstrated a clear therapeutic benefit including improvement of clinical status and exercise performance as well as an improved quality of life. During ECP the aortic and intracoronary average and diastolic blood flow and pressure are increased while systolic pressure is decreased. This increase in blood flow results in increased shear stress in the arterial system suggesting also an improvement of the shear stress in the coronary artery bed. The mechanism by which ECP alleviates angina includes improvement of peripheral and coronary endothelial function, improvement of ventricular function, favorable peripheral effects similar to that of physical training and the recruitment and proliferation of collateral arteries. The latter process, termed arteriogenesis, may be initially triggered by physical forces: in the presence of a stenosis blood flow and consequently endothelial shear stress are increased across the lumina of pre-existing anastomotic arteries. Shear stress is a major trigger of arteriogenesis. Clinical studies have demonstrated a clear positive correlation between collateral formation and physical activity. A well-developed coronary collateral system minimizes the loss of myocardium in case of myocardial infarction and reduces the long-term cardiac mortality. However, only one third of the patients with CAD and residual stenosis or occlusions possess adequate collateral networks. ECP is therefore an attractive therapeutic option for the non-invasive stimulation of collateral growth.

In clinical ECP therapy programs, a patient must undergo the therapy for 35 one-hour sessions, usually scheduled over a 5-day work week for a period of seven weeks. This regimen can be rigorous and places demands upon a patient's schedule. If a patient misses sessions, it can have an adverse effect on the treatment.

The only ECP systems currently available are of the clinical type and some have received FDA approval. These systems, while touting their portability, remain bulky and in practical operation are not very mobile. The systems generally include a custom reclining bed and a control cart, which includes a display, input device, as well as the air and vacuum supply components. A number of air bladders (or cuffs) are provided for the patient to wear while reclining on the bed for treatment. These bladders are connected to the control cart with a series of hoses and sensor wires which monitor the patient's heartbeat as well as the performance of the air bladders.

There is therefore a need for a portable oscillating compression system that provides similar treatment to an ECP system at level suitable for unsupervised use that allows for more flexible treatment options, can be used to treat or improve a variety of patients, and can provide users with a measure of improvement in their cardiovascular system to relieve pain, improve circulation and quality of life.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A is a front view and FIG. 3B is a rear view;

FIG. 12 is top view of a buttocks cuff and hose of the portable oscillating compression system of the present invention.

SUMMARY OF THE INVENTION

Figure 1:
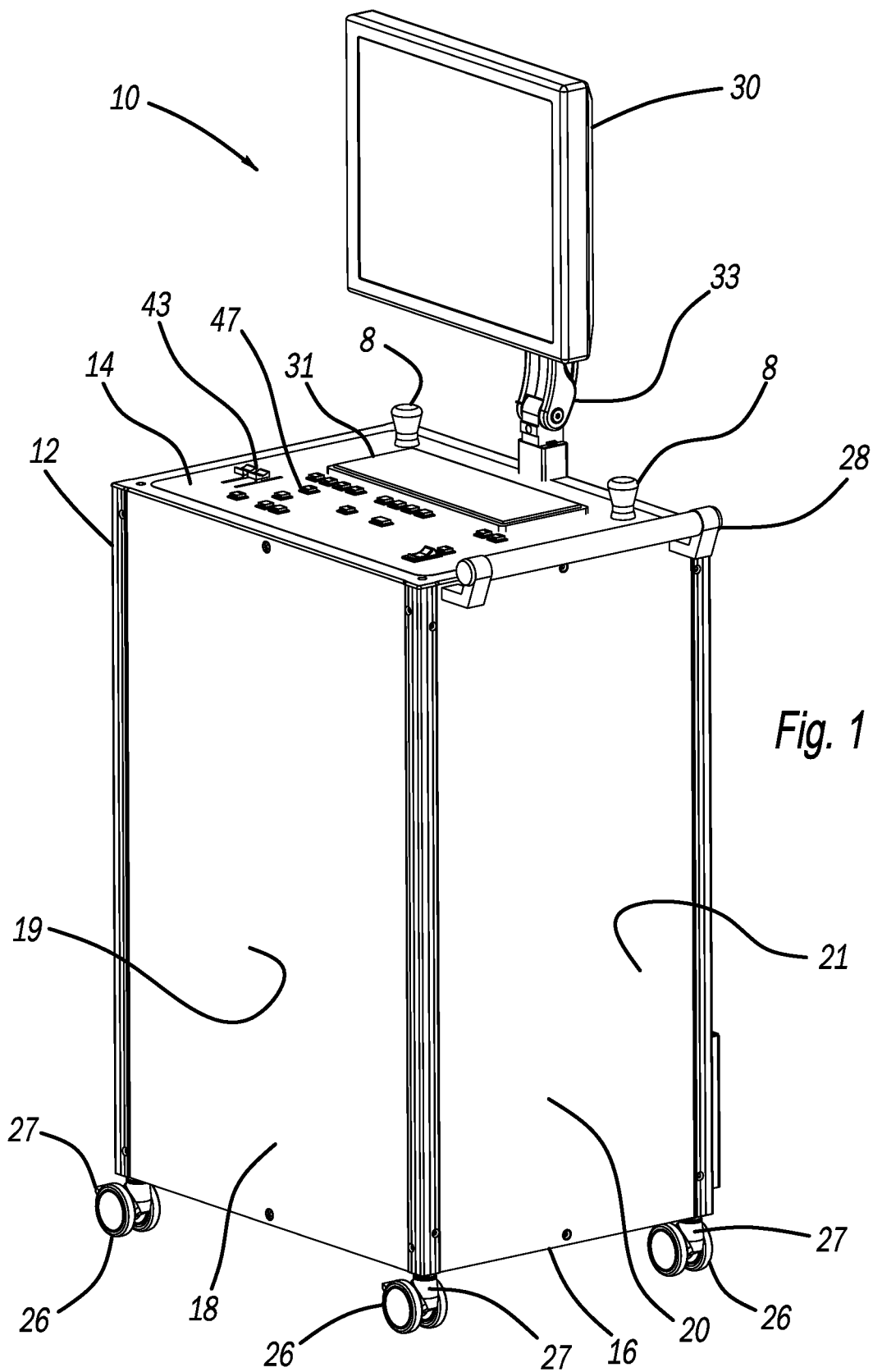
FIG. 1 is a side view of the portable oscillating compression system of the present invention.
Figure 2:
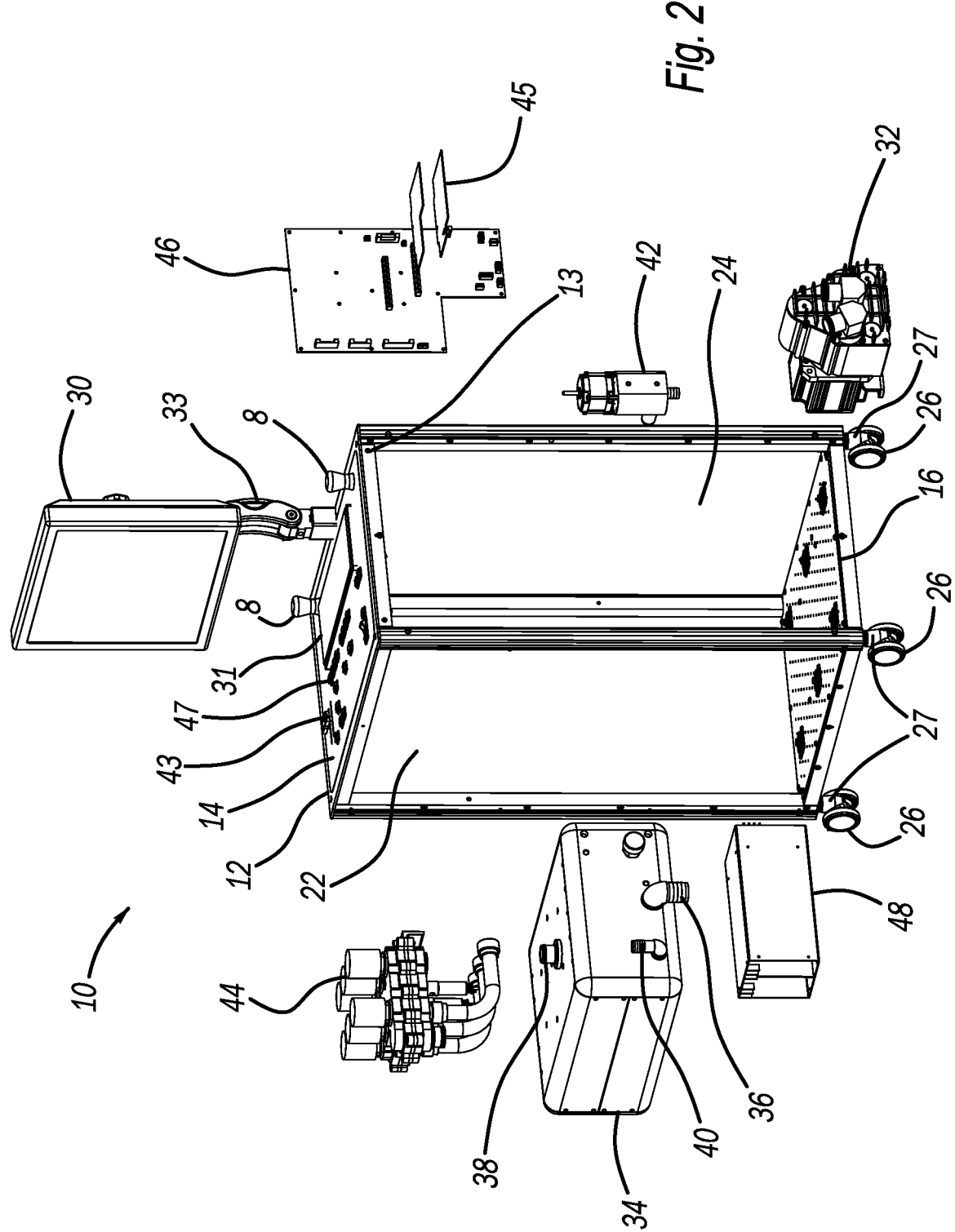
FIG. 2 is an exploded side view of the portable oscillating compression system of the present invention.

Generally, the present invention provides a portable oscillating compression system. The system can include an air compressor, an accumulator tank, an air pressure adjustment module, a valve body assembly, hoses, inflatable cuffs, a controller, a power supply and a housing. The air compressor takes in air and compresses it to a predetermined pressure, after which it is deposited in the accumulator tank. The accumulator tank stores compressed air from the air compressor until the compressed air is needed by the system. The accumulator tank is also connected to an air pressure adjustment module. The air pressure adjustment module allows the air compressor to operate at a constant speed, providing constant air pressure to the accumulator tank. As the compressed air is removed from the accumulator tank by the system, the air pressure adjustment module regulates the compressed air in the accumulator tank, venting air above a predetermined pressure. The valve body assembly is connected to the accumulator tank. The valve body assembly intakes compressed air from the accumulator tank and distributes it as directed by the system. The hoses receive compressed air from the valve body assembly. The hoses are connected to inflatable cuffs that include bladders and can be secured to a patient. The inflatable cuffs are inflated by the compressed air from the valve body assembly and deflate when the compressed air is halted by the valve body assembly. The system controller includes software for processing and operating the system including detecting the electrical signals of the heart of the patient and the blood oxygen level of the patient. The controller also operates the valve body assembly, directing the inflation and deflation of the cuffs. The controller also includes a computer and input/output devices. The power supply provides power to the system components. All of the system components are located about the system housing, which can include wheels for portability and mobility.

DETAILED DESCRIPTION OF THE INVENTION

The systems and methods described herein are not limited in their application to the details of construction and the arrangement of components set forth in the description or illustrated in the drawings. The present invention is capable of other embodiments and of being practiced or of being carried out in various ways. Also, the phraseology and terminology used herein is for the purpose of description and should not be regarded as limiting. The use of "including", "comprising", "having", "containing", "involving" and variations thereof herein, is meant to encompass the items listed thereafter, equivalents thereof, and additional items, as well as alternate embodiments consisting of the items listed thereafter exclusively.

Generally, the present invention provides a portable oscillating compression system for use in providing an external counter pulsation treatment to a patient. Most generally the system 10 of the present invention includes a housing frame 12 and panels 14, 16, 18, 20, 22, 24, an air compressor 32, an accumulator tank 34, an air pressure adjustment module 42 (APAM), a valve body assembly 44, a controlling device 48, a power supply 49, hoses 150, 170 190, and inflatable cuffs 160,162,180,182,200.

The term "oscillation" or "oscillating" as used herein is used to describe a recurring or periodic event, i.e. one that occurs at intervals. The portable oscillating compression system 10 of the present invention provides oscillating compression to the extremities of a patient using compressed air delivered to inflatable cuffs 160,162,180,182,200 secured about the extremities of the patient in a configuration that is known to those of skill in the art. The oscillating compression occurs in coordination with the heartbeat of the patient, hence the term "external counter pulsation" in a manner known to those of skill in the art as discussed in the Background. The cuffs 160,162,180,182,200 are inflated at the beginning of the diastole portion of a heartbeat, when the heart is drawing in blood from the rest of the body. The cuffs 160,162,180,182,200 are deflated at the end of the diastole, just before the systole portion of the heartbeat, when the heart pushes blood out to the rest of the body.

The term "electrocardiogram" or "ECG" as used herein means the recording of a transthoracic interpretation of the electrical activity of the heart over a period of time, as detected by electrodes 220 attached to the surface of skin and communicated to the system 10 by leads 222. The ECG measures the electrical conductivity of the heart. The ECG captures electrical impulses generated by the polarization and depolarization of cardiac tissue and translates them into a waveform. The waveform is then used to measure the rate and regularity of heartbeats, as well as other information about the heart.

The term "hose" as used herein is intended to include a hose or other similar conduit. The hoses are used for transporting compressed air. The hoses can be formed of a material that can withstand pressure, such materials are known to those of skill in the art. Some examples of materials include polymers, composites, or alloys.

The terms "systole" and "diastole" as used herein refer to, respectively, the gathering of blood with contraction of the heart and the period of time when the heart refills with blood after contraction. The portable oscillating compression system of the present invention uses an ECG from a patient to determine when to inflate and deflate the cuffs 160,162,180, 182,200 secured about the extremities of the patient. The inflation of the cuffs 160,162,180,182,200 begins at the beginning of the diastole, when the heart is refilling with blood. The inflated cuffs 160,162,180,182,200 compress the extremities of the patient, forcing blood toward the heart. The pressure is released at the end of the diastole, before the systole begins.

More specifically, the system 10 of the present invention is a portable oscillating compression system for use in providing an external counter pulsation treatment to a patient. The system 10 includes a housing frame 12 that is sufficiently sized to contain all of the components of the system 10. Further, the housing frame 12 is generally formed as a box with open sides. In the preferred embodiment, the housing frame 12 is approximately 92 cm tall with a width of 60 cm wide and a depth of 45 cm. When the housing frame 12 is made of aluminum enclosed by ABS panels, then the system 10 with the previous dimension weighs approximately 65 kg. The housing frame 12 is formed of a material that is sturdy yet light, such materials are known to those of skill in the art. Some examples of the materials include, but are not limited to metals and alloys of metals, such as aluminum or titanium.

Additionally, the housing frame 12 is enclosed by a set of panels including top panel 14, bottom panel 16, front panel 18, right side panel 20, left side panel 22, and back panel 24. The panels 14,16,18,20, (left side panel and right side panel not shown) are sized to fit within the frame. The panels 14,16,18,20,22,24 include holes 13 through which fasteners 29 pass and secure the panels 14,16,18,20,22,24 to the housing frame 12. Alternatively, the housing frame 12 can include channels into which the panels 14,16,18,20,22,24 can placed for maintaining the panels 14,16,18,20,22,24 in proper alignment. The panels 14,16,18,20,22,24 are generally easily removable for service of the system 10. The panels 14,16,18,20,22,24 can also include graphics and labels providing instructions or labeling of controls that pass through the panel surfaces 15,17,19,21, (left side panel surface and back panel surface not shown). The panels 14,16,18,20,22,24 are formed of a material that is resilient and somewhat dent-resistant, such materials are known to those of skill in the art. Some examples of the materials include, but are not limited to, polymers such as Acrylonitrile Butadiene Styrene (ABS) or lightweight metals such as aluminum or other compounds having the characteristics described herein.

Additionally, the system 10 can include moving devices 26 mounted to the bottom panel 16 of the housing frame 12. Examples of such moving devices 26 include, but are not limited to, wheels, bearings, casters and other similar devices known to those of skill in the art. Preferably, the moving devices 26 can also include locking mechanisms 27 to prevent the system 10 from rolling unexpectedly. The locking mechanism 27 can include a locked and unlocked position to provide greater ease in use, such that the locked position prevents undesired movement of the system 10, while the unlocked position enables the system 10 to freely move. In use, the system 10 can be positioned next to a chair, bed, or other suitable location. The mobility of the system 10 allows an operator to easily bring the system 10 to a patient, rather than require the patient to travel to the system 10, as is the case with traditional, bulky systems.

The housing frame 12 can also include a handle 28 that can be mounted on the exterior surface 11 of either on the top panel 14 or one of the four side panels 18, 20, 22, or 24. The handle 28 can be formed in any shape known to those of skill in the art to be capable of use as a handle. The handle 28 is preferably sized to be able to be grasped by the user. The handle 28 is preferably made of the same material as the housing frame 12, but can be formed of a different material. The handle 28 can either be affixed or mounted onto the exterior surface 11 of the housing frame 12 or connected to an exterior surface 11 of one of the side panels 14, 18, 22, or 24 after the housing has been formed using an affixing device, such as a screw or other similar device known to those of skill in the art. Alternatively, the handle 28 can be formed as a single unit with the housing frame 12.

The housing frame 12 and panels 14,16,18,20,22,24 enclose the system 10 of the present invention. The system 10 includes an air compressor 32, secured to bottom panel 16 with brackets 312, that takes in air through filter 300 and hose 302. Filter 300 can be any type of filter known to those of skill in the art capable of filtering air. Examples include, but are not limited to foam or paper filters. Hose 302 is secured to air compressor 32 with clamp 304. The air compressor 32 and compresses the air to a predetermined pressure, after which the air is deposited in the accumulator tank 34. The predetermined pressure supplied by the air compressor 32 is generally between approximately 3.5 kPa and 55.2 kPa, as is readily known to those of skill in the art of external counter pulsation. The air compressor 32 can be a single compressor or multiple compressors. The air compressor 32 can be any air compressor known to those of skill in the art to be able to be used in the manner described herein. Examples include, but are not limited to, rotary compressor, scroll compressor, and other similar compressors. The air compressor 32 can operate in a variety of modes, such a continuous or periodic. The air compressor 32 can also include a pressure monitor that provides information to the system 10 regarding the output pressure supplied by the air compressor 32.

Figure 3A:
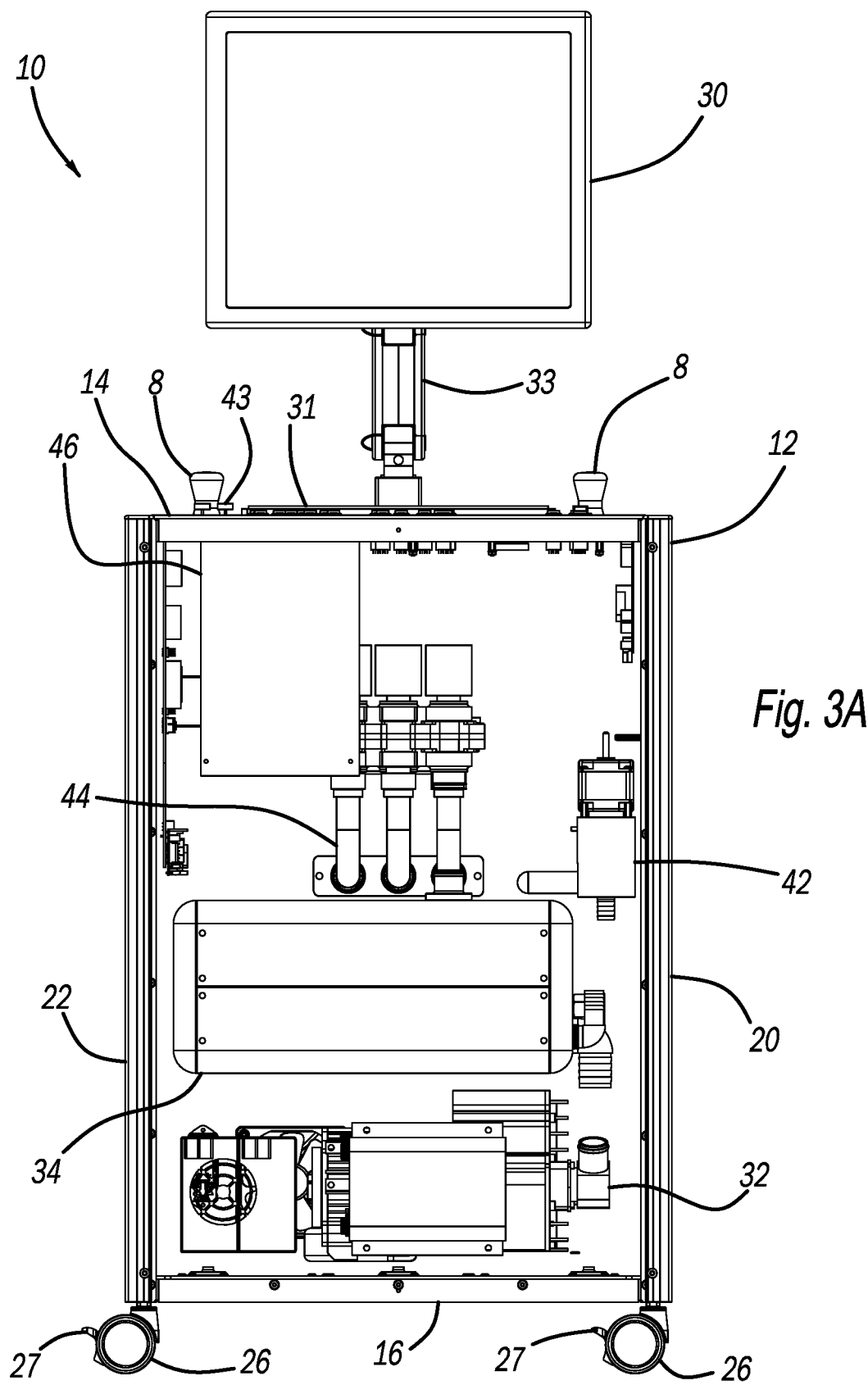
FIGS. 3A and 3B are cutaway views of the portable oscillating compression system of the present invention.
Figure 3B:
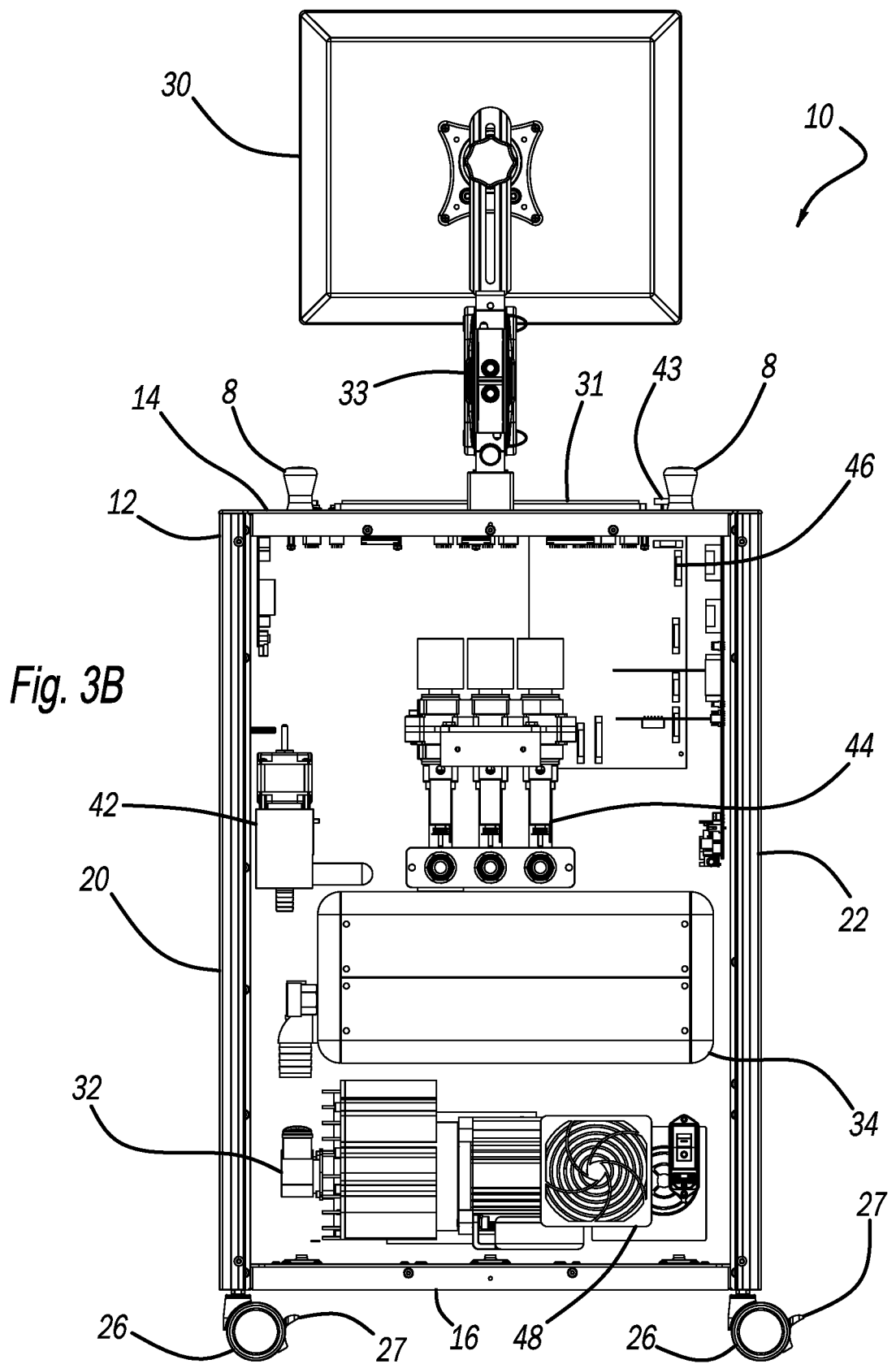
Figure 4:
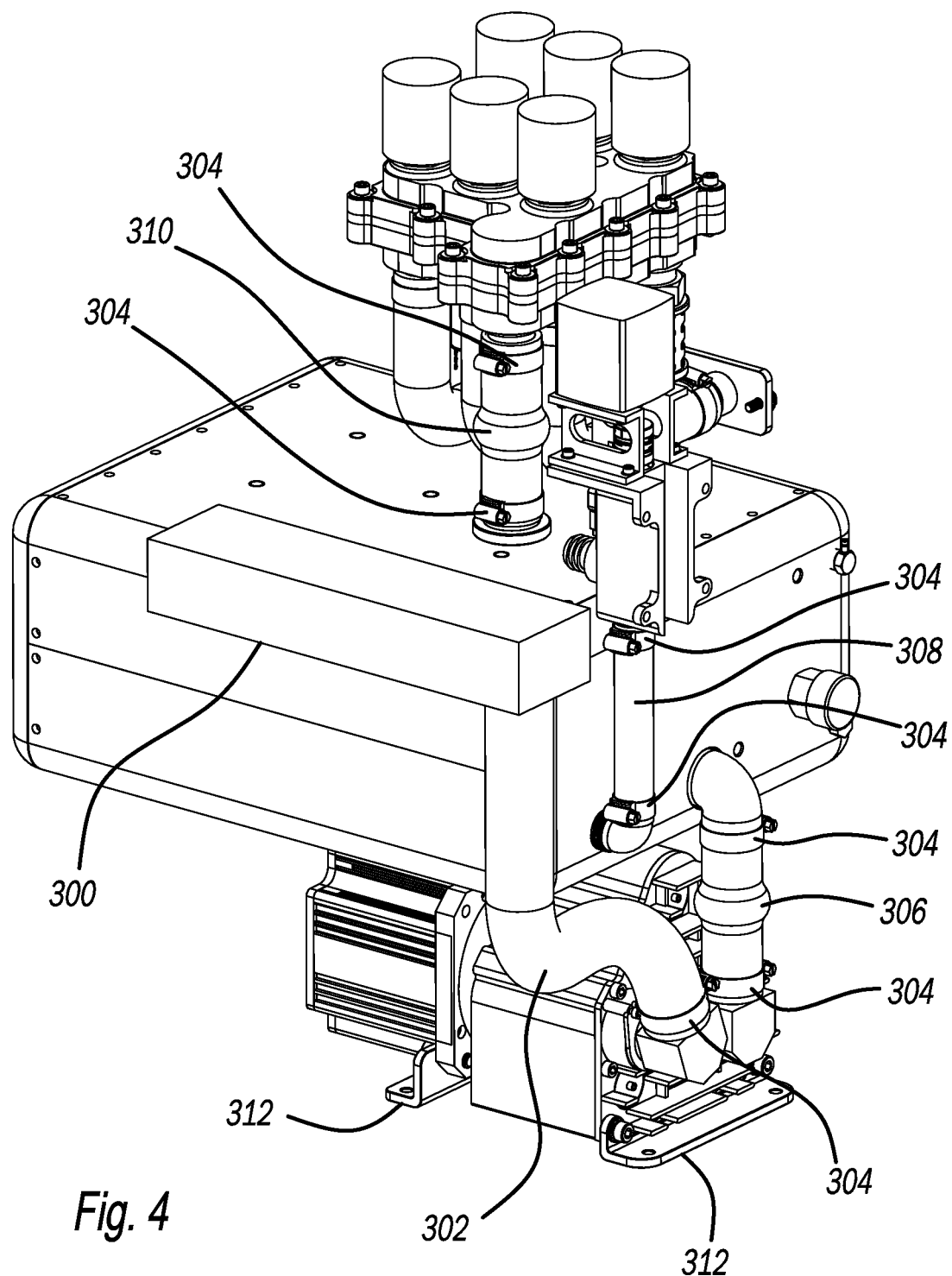
FIG. 4 is an exploded side view of the filter, an air compressor, accumulator tank, air pressure adjustment module, and valve body assembly connected by hoses of the portable oscillating compression system of the present invention.
Figure 5:
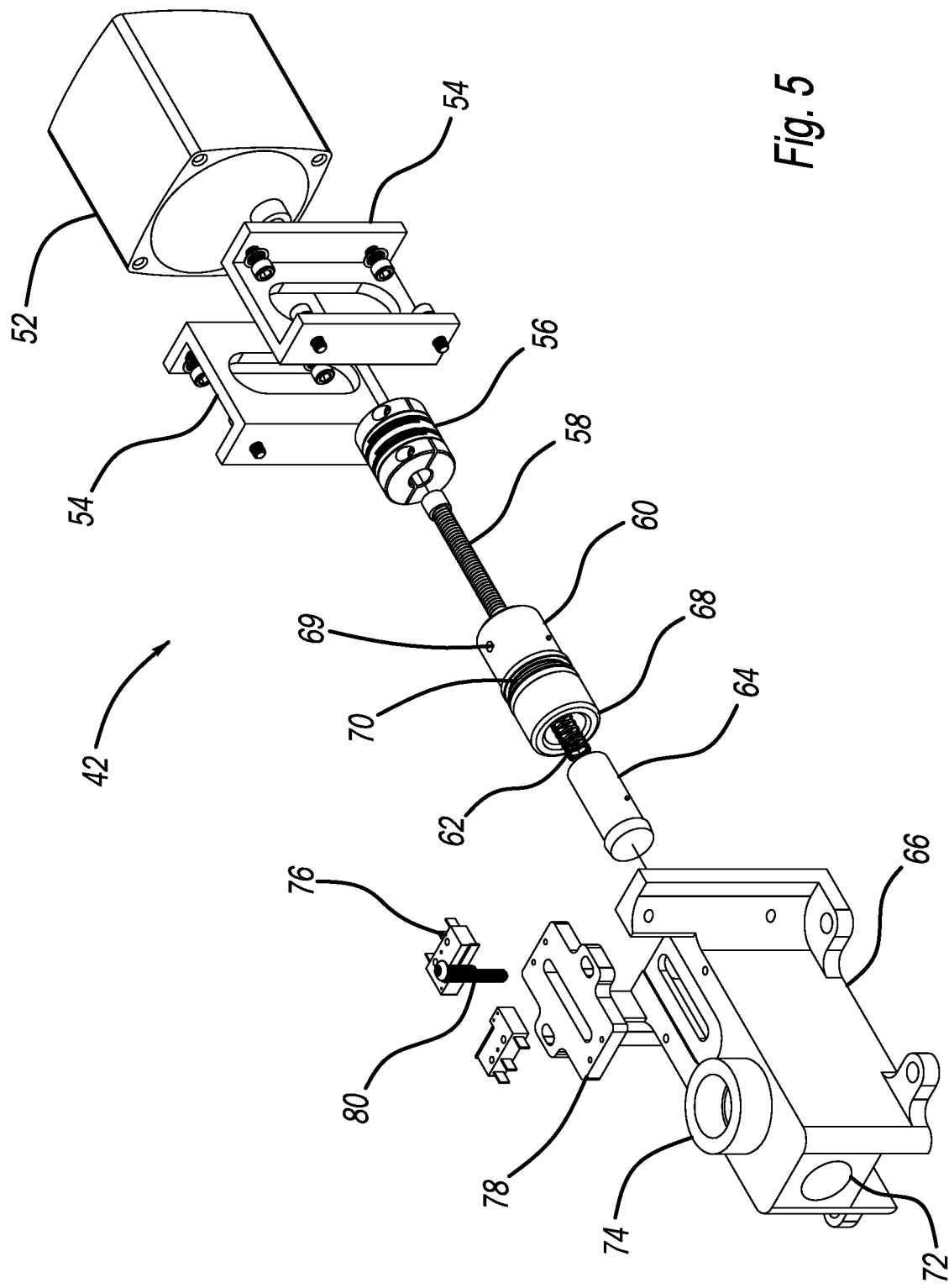
FIG. 5 is an exploded view of an air pressure adjustment module of the portable oscillating compression system of the present invention.

The accumulator tank 34 stores compressed air from the air compressor 32 until the compressed air is needed by the system 10. The accumulator tank 34 can be any tank known to those of skill in the art to be able to hold and maintain compressed air. The accumulator tank 34 is sized to be large enough to maintain a volume of compressed air needed to inflate the cuffs 160,162,180,182,200 of the present invention to a pressure sufficient for providing the external counter pulsation treatment. The accumulator tank 34 can be a single tank or multiple tanks. The tanks 34 must generally be able to hold at least 12 liters of air. In the preferred embodiment, the tank 34 is generally 22 cm tall with a width of 40 cm wide and a depth of 35 cm. The tanks 34 can be formed of a variety of materials as are known to those of skill in the art to be able to contain pressurized air. Examples of such materials include, but are not limited to, aluminum, titanium or polymers. The tanks 34 can be formed using a variety of techniques, such as but not limited to molding tanks 34 with fiber-reinforced polymers. The tanks 34 can be shaped in a variety of ways, including, but not limited to, spheres or cylinders. If multiple tanks are utilized, the tanks 34 can be joined together to receive compressed air from the air compressor 32. The tanks 34 can be mounted to the system housing frame 12 using fasteners 29 to secure the tanks 34 to the housing frame 12. In the preferred embodiment, the tank 34 is mounted to housing frame 12 as shown in FIGS. 3A and 3B. The tank 34 can be otherwise affixed/mounted within the system 10 without departing from the spirit of the invention.

The accumulator tank 34 can include at least one intake port 36 through which the tank 34 receives compressed air from the air compressor 32. The tank 34 also includes at least one outlet port 38 through which compressed air exits the accumulator tank 34 via a hose 306 to the valve body assembly 44 and at least one outlet port 40 through which compressed air exits the tank 34 to the air pressure adjustment module (APAM) 42. The air compressor 32 is connected to the accumulator tank 34 by a hose 306 that is affixed to both the intake port 36 and the outlet port 40. The hose 306 is attached to the air compressor 32 using a clamp 304 and to an intake port on the tank 34 using a clamp 304 such that air can only flow from the air compressor 32 to the tank 34. The clamp 304 can be of a variety of types known to those of skill in the art, such as, but not limited to, a stainless steel worm drive clamp.

The APAM 42 regulates air pressure stored within the tank 34, maintaining a predetermined pressure by releasing excess pressure to the atmosphere. The APAM 42 is connected to the tank 3 using a hose 308. The hose 308 is clamped to the tank 34. The clamp 304 can be of a variety of types known to those of skill in the art, such as but not limited to, a stainless steel worm drive clamp.

In other words, the compressed air enters the APAM pressure valve body 66 via a hose 308 attached to the accumulator tank 34. The compressed air acts upon the valve plunger 64, applying an axial force on the plunger 64 moving it toward an APAM motor 52. The plunger 64 exerts a resistive force to the compressed air through an APAM compression spring 62. The position of the valve plunger 64 stabilizes when the opposing forces are equal. Depending upon the equilibrium position of the plunger 64, compressed air can flow through the APAM pressure valve body 66 and out to the atmosphere through a silencer 108. The equilibrium position is variable and can be controlled by the operator using the APAM switches 43 of the controlling device 46 or can automatically controlled. The APAM 42 can also include a limit switch 78 on the pressure valve body 66 that is activated by a set screw 80 attached to the bushing 60 that provides restriction for the minimum and maximum linear displacement of the plunger 64. In the preferred embodiment, the compressed air from the accumulator tank 34 can be regulated from approximately 3.5 kPa to 55.2 kPa that is used to inflate the cuffs 160,162,180,182,200 of the system 10. This regulation by the APAM 42 enables the air compressor 32 to operate at a constant speed by providing constant air pressure to the accumulator tank 34. The APAM 42 regulates the pressure of air in the accumulator tank 34 by the position of the plunger 64 which selectively restricts the flow of air through the pressure valve body 66 to the atmosphere. The APAM 42 can be modulated as needed either prior to commencing use of the system 10 or during the operation of the system 10. The modulation of the system 10 can be accomplished either manually using controls 8 located on the exterior surface 15 of the top panel 14. The controls 8 can include, but are not limited to, buttons, knobs, dials, sliders, emergency stop switches, keyboards and other computer input devices. Alternatively, the modulation of the system 10 can be accomplished using a controlling device 46.

In the preferred embodiment, the APAM 42 is approximately 20 cm long, 8 cm wide, and 8 cm tall. The APAM 42 components are formed of resilient materials capable of performing under the conditions in which they were intended to be used, examples include, but not limited to, aluminum, aluminum alloys, titanium, nitrile, and rubber. In the preferred embodiment, the APAM 42 is mounted to housing frame 12 as shown in FIGS. 3A and 3B. The APAM 42 can be otherwise affixed/mounted within the system 10 without departing from the spirit of the invention.

In a preferred embodiment, the AC motor 52 can have an output of 120 rpm at 115 VAC. The AC motor 52 can be a geared synchronous motor, but other motors can also be used without departing from the spirit of the invention. The APAM 42 regulates the release of the compressed air in the accumulator tank 34, venting extraneous air above a predetermined pressure. The predetermined pressure can be defined by one of skill in the art, but generally is approximately above 56 kPa.

In operation, the air pressure of the system 10 can fluctuate due to the requirements of the controller 46 and/or the adjustments of the operator of system 10. The APAM 42 regulates the air pressure of system 10, which enables the compressor 32 to operate at a continuous speed or continuous pressure. More specifically, the APAM 42 includes a motor 52 for adjusting the pressure of the compressed air stored in the accumulator tank 34. The motor 52 can be either an AC or DC geared synchronous motor. The motor 52 drives the axle 58 that is secured to the output shaft of motor 52 with a helical flex shaft coupling 56. The coupling 56 allows the motor 52 to smoothly adjust the position of the pressure valve bushing 60 within the pressure valve body 66. The motor is secured to valve body 66 by a pair of brackets 54. The axle 58 is secured to a pressure valve bushing 60 via a set screw 69. As the axle 58 rotates, the pressure valve bushing 60 moves linearly along the drive axis of the axle 58, thereby altering the position of the busing 60 within the valve body 66. The bushing 60 includes a seal 70 that prevents compressed air from escaping between the bushing 60 and the valve body 66 as the bushing 60 is moved linearly. The compression spring 62 is disposed within the cavity 68 and the plunger 64 and provides a compressive force against the bushing 60 to provide pressure against the valve plunger 64. A plunger 64 is enclosed within the valve body 66 and cavity 68 and moves linearly along with bushing 60 driven by axle 58. Compressed air enters the valve body 66 through the air inlet 72 via a hose 310 connected to the tank 34. The hose 310 is secured to tank 34 and the valve body 66 with clamps 304. The compressed air from the tank 34 exerts a force upon the plunger 64. The compression spring 62 exerts an opposing force on the plunger 64. The equilibrium position of the plunger 64 is determined by the summation of the two forces. If the force of the compressed air exceeds the force of the compression spring, then the plunger 64 will be forced into the cavity 68 resulting in compressed air moving past the plunger 64 and out of the valve body 66 through the air outlet port 74 to the atmosphere. If the force of the compressed air is less than the force of the compression spring, then the plunger 64 will not be displaced by the compressed air from the tank 34 and no compressed air will pass by the plunger 64. The minimum and maximum position of the plunger 64 is determined by the limit switch 76 which is secured to the valve body 66 by the limit switch plate 78. The position of the limit switch 76 is secured by the limit switch set screw 80.

The valve body assembly (VBA) 44 is approximately 23 cm wide by 20 cm tall by 20 cm deep and is mounted to housing frame 12 with a plurality of fasteners. The VBA 44 and components can be formed of materials that can withstand compressed air. Some examples include, but are not limited to, aluminum, steel alloy, titanium, and polymers, composites, and alloys thereof. In the preferred embodiment, the VBA 44 is mounted to housing frame 12 as shown in FIGS. 3A and 3B. The VBA 44 can be otherwise affixed/mounted within the system 10 without departing from the spirit of the invention.

The compressed air from the tank 34 enters the VBA 44 via a hose 310 through an air inlet port 104. The compressed air first encounters intake valve solenoids 86 which selectively open allowing compressed air to proceed through the VBA 44 into the outlet port 106. When the solenoids 86 close, exhaust solenoids 88 open, allowing compressed air to flow back into the VBA 44 through outlet ports 106 and through silencer ports 102 and silencers 108 to the atmosphere. The cycle repeats until treatment ends, at which time both the intake 86 and the exhaust solenoids 88 are closed, and the vent valve solenoids 110 are opened, allowing compressed air to flow back into the VBA through the air outlet ports 106. The compressed air is then vented through the vent ports 100 into the atmosphere.

Figure 6:
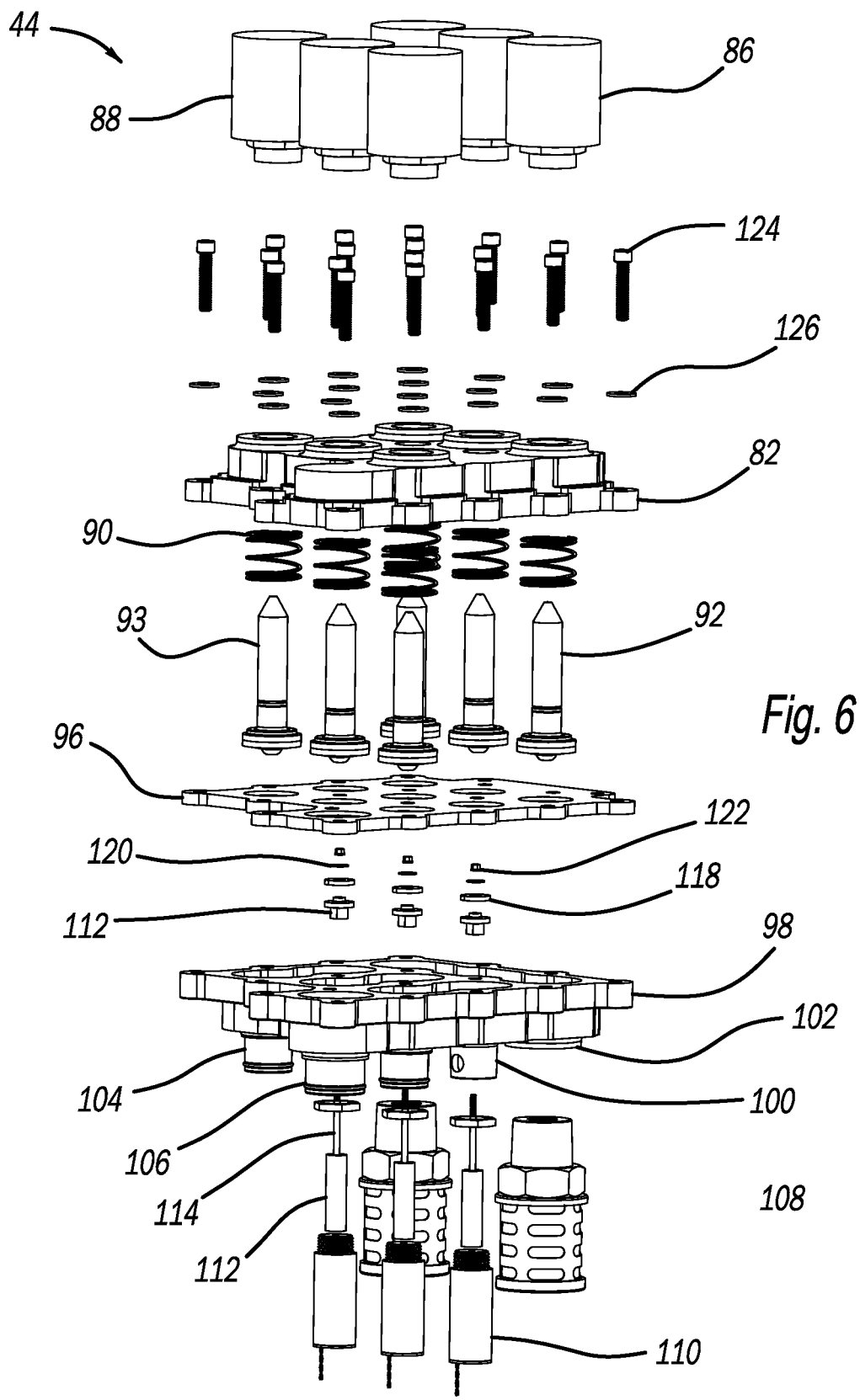
FIG. 6 is an exploded view of a valve body assembly of the portable oscillating compression system of the present invention.
Figure 7:
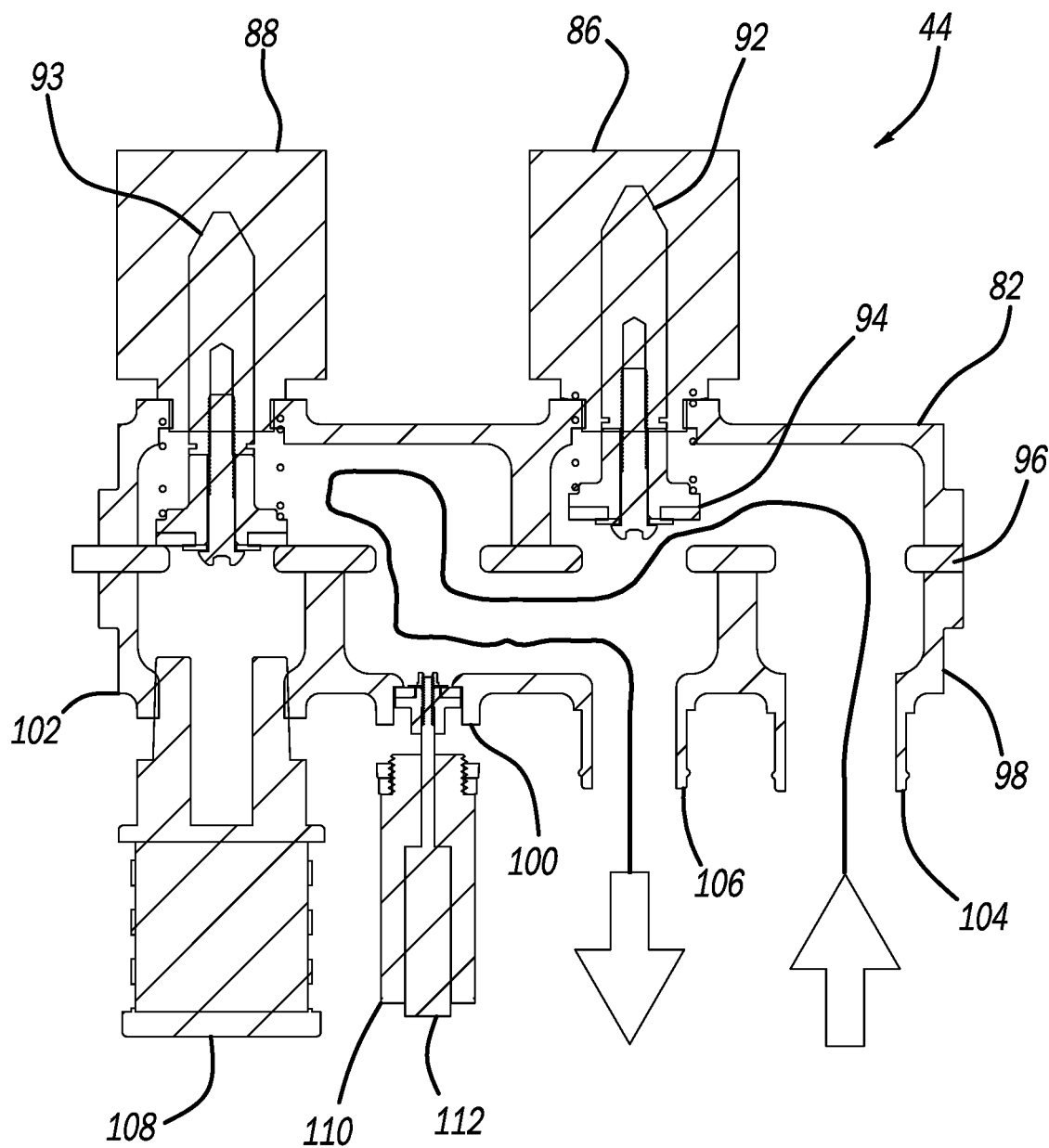
FIG. 7 is a cross-sectional view of the VBA as shown in FIG. 5.
Figure 8:
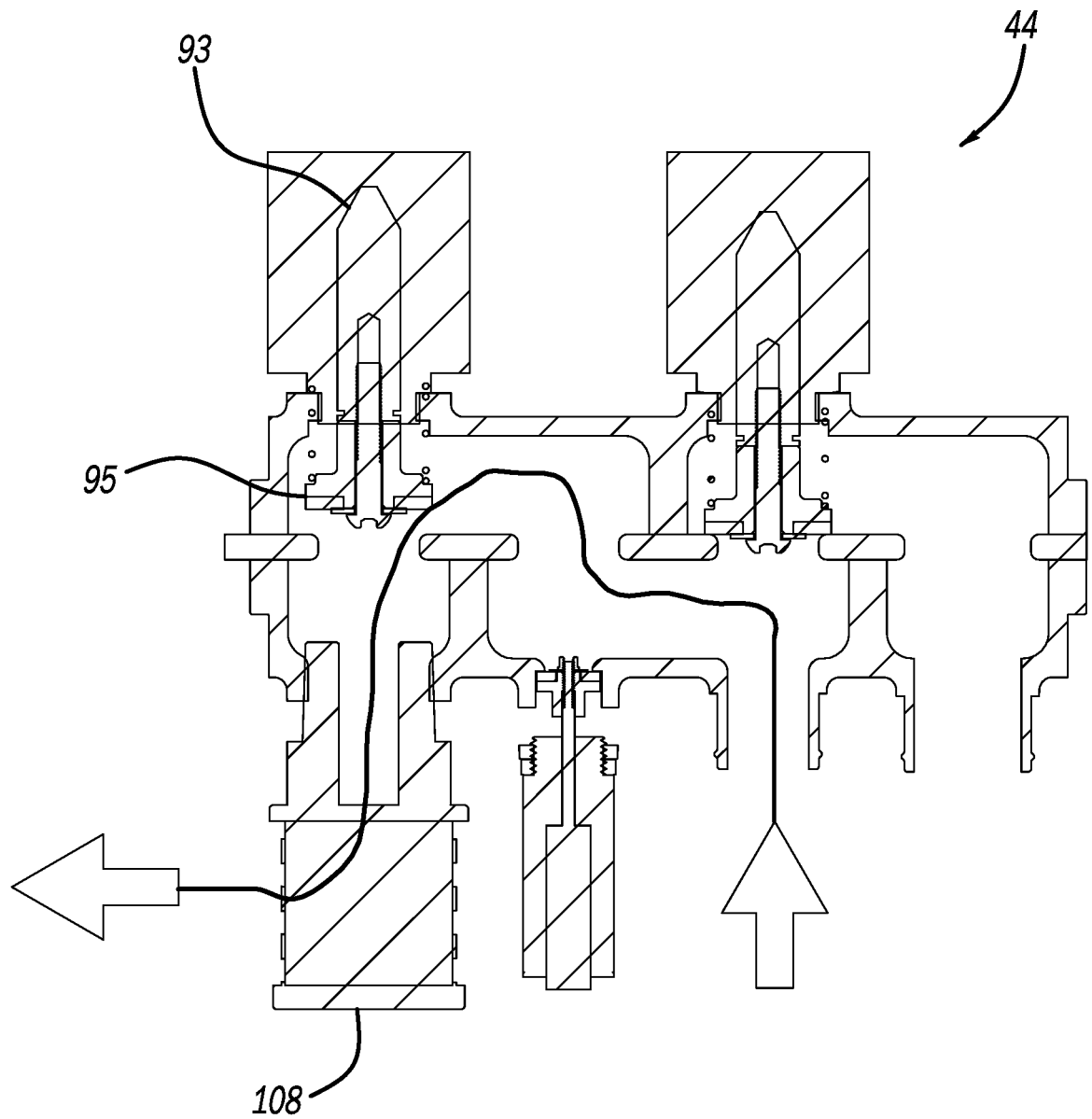
FIG. 8 is a cross-sectional view of a VBA as shown in FIG. 5, wherein arrows are used to depict air flow through the VBA during the cuff exhaust mode, at the end of diastole.
Figure 9:
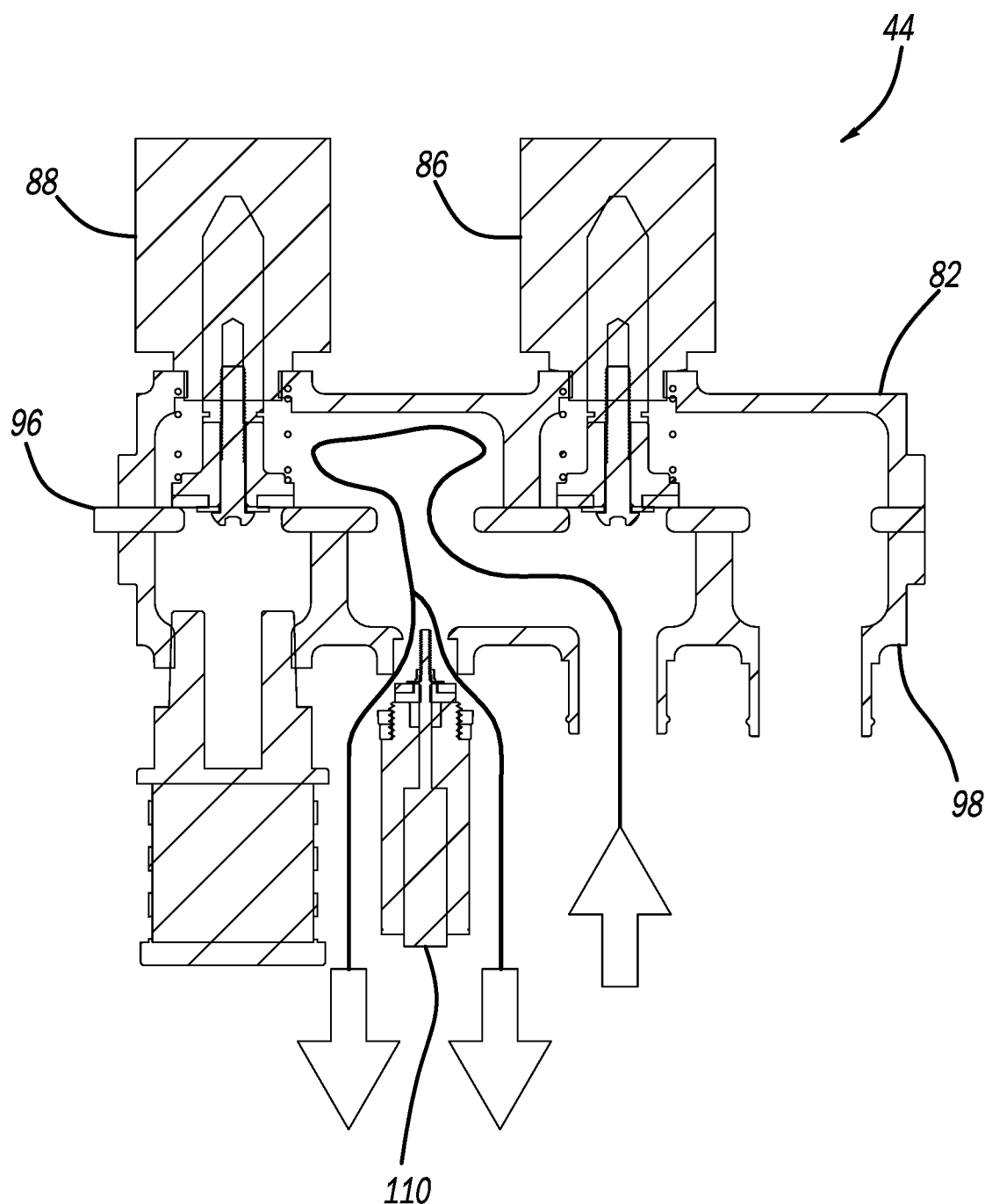
FIG. 9 is a cross-sectional view of a VBA as shown in FIG. 5, wherein arrows are used to depict air flow through the VBA at the end of treatment, when the system is vented to the atmosphere.
Figure 10:
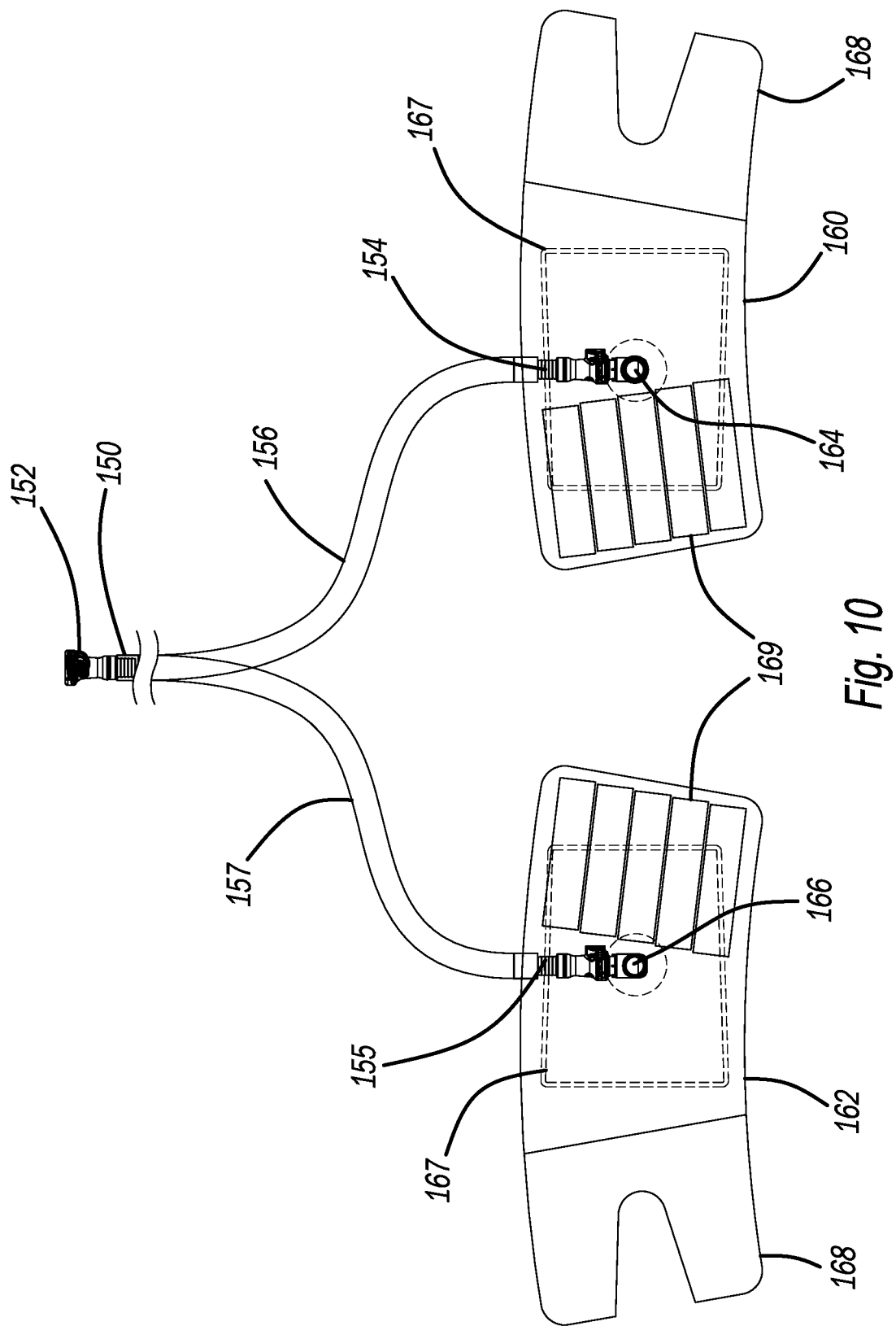
FIG. 10 is a top view of calf cuffs and hose of the portable oscillating compression system of the present invention.
Figure 11:
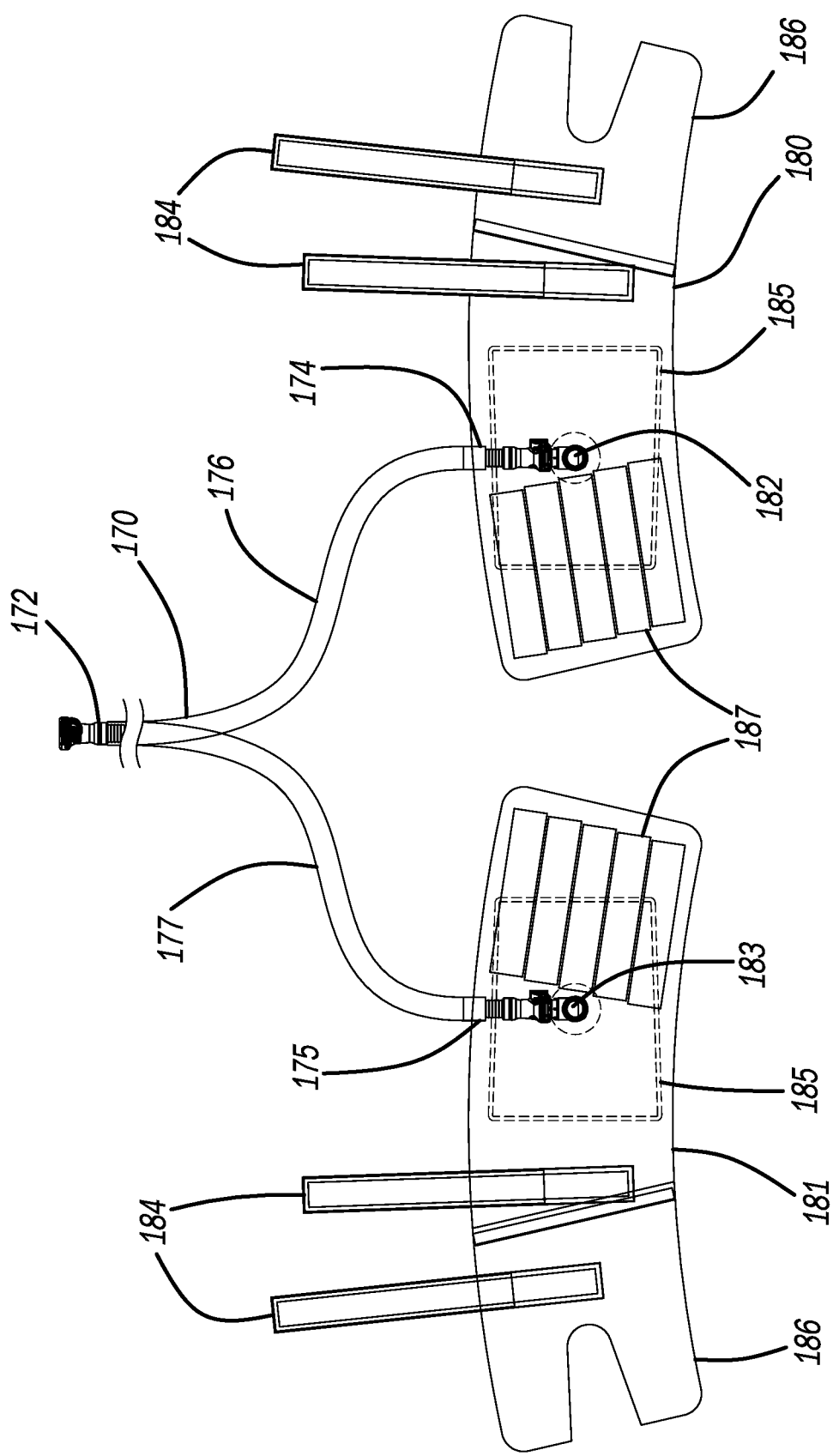
FIG. 11 is a top view of thigh cuffs and hose of the portable oscillating compression system of the present invention.
Figure 13A:
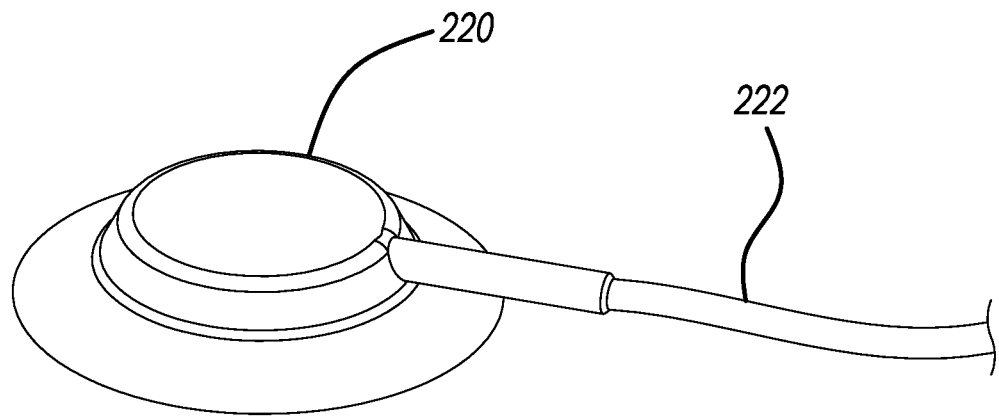
FIGS. 13A and 13B are side views of an electrode with lead (FIG. 13A) and a finger-tip type pulse oximeter (FIG. 13B).
Figure 13B:
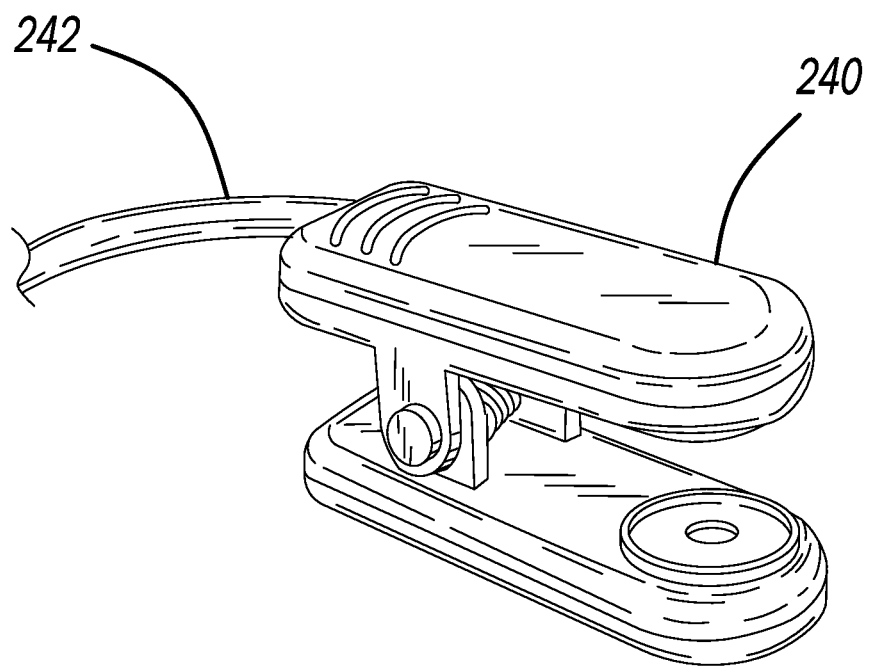

More specifically, during the intake portion of a cycle, the compressed air (flow as indicated by the arrows in FIGS. 6-8) enters a second valve body portion 98 of the VBA 46 through an air inlet port 104 and passes through the transfer plate 96 into the first valve body portion 82. The intake valve solenoid pintle heads 92 are held in place (closed), via intake seals 94, against a transfer plate 96 due to the pressure of the compressed air against the pintle heads 92. At least three intake solenoids 86 are energized sequentially, allowing compressed air to flow past the pintle heads 92 and out through the outlet ports 106 to the hoses 150,170,190. The hoses 150,170,190 are connected to the inflatable cuffs 160,162,180,182,200. The exhaust valve solenoids 88 remain de-energized (closed), and the three vent valve solenoids 110 remain energized (closed). After the third of intake valve solenoid 86 opens, the three intake solenoid valves 86 close simultaneously.

Next, the exhaust valve solenoids 88 are energized simultaneously, causing the exhaust valve pintle heads 93 to retract and the compressed air to return from the hoses 150,170,190 and the cuffs 160,162,180,182,200 through the outlet ports 106 and the transfer plate 96 past the seals 95 and out through the three silencer ports 102 and the silencers 108 to the atmosphere. The three intake valve solenoids 86 remain de-energized (closed), and the three vent valve solenoids 110 remain energized (closed). The three exhaust valve solenoids 88 then close simultaneously, after which the first of the intake valve solenoids 86 are energized and the first of the intake pintle head 92 retracts, beginning another cycle. At the last cycle, the three intake valve solenoids 86 and the three exhaust valve solenoids 88 are de-energized (closed). The three vent valve solenoids 110 are simultaneously de-energized (opened), retracting the three vent valve pintles 116 releasing compressed air that returns from hoses 150,170,190 and cuffs 160,162,180,182, 200 through outlet ports 106 and exits VBA 44 through the three vent ports 100 simultaneously to the atmosphere. The three vent ports 100 operate in unison and together allow for the compressed air to vent efficiently.

A calf hose 150 is used to connect the system 10 to the calf cuffs 160,162. The calf hose 150 is of a sufficient length as to enable attachment of the calf cuffs 160,162 to the system 10 without causing the system to move unintentionally, preferably the calf hose is at least 1.9 cm in diameter and 1.5 m in length. The calf hose 150 includes a connector 152 to connect to the valve body assembly 44, a right side connector 154 to connect to the fitting 164 for right side calf cuff 160, a left side connector 155 to connect to the fitting 166 for the left side calf cuff 162. The calf hose 150 divides into two separate but equal side hose units, a right side calf hose 156 and left side calf hose 157. The calf hose 150 is secured to connectors 152, 154, 155. The connector can be of a variety of types known to those of skill in the art, such as but not limited to a polymer quick-connect connector. The right side calf cuff 160 and the left side calf cuff 162 can be any cuffs known to those of skill in the art for use in an external counter pulsation system. For example, the calf cuffs 160, 162 can be approximately 40 cm long by 30 cm wide. The calf cuffs 160, 162 include right side bladder connector 164 and left side bladder connector 166 that are each connected to inflatable bladder 167 contained within the calf cuffs 160, 162. The calf cuffs 160, 162 can be formed of a material that can withstand pressure, such materials are known to those of skill in the art. Some examples include synthetic fabrics such as nylon. The calf cuffs 160, 162 include hook fastener pads 168 and loop fastener pads 169 for securing and maintaining the calf cuffs 160,162 in place about the calves of a patient. The hook fastener pads 168 and loop fastener pads 169 can be formed of materials that can withstand pressure, such materials are known to those of skill in the art. Examples of such materials include synthetic materials such as nylon.

A thigh hose 170 is used to connect the system 10 to the thigh cuffs 180,181. The thigh hose 170 is of a sufficient length as to enable attachment of the thigh cuffs 180,181 to the system 10 without causing the system to move unintentionally, preferably the thigh hose 170 is approximately 3.8 cm in diameter and approximately 1.5 m long. The thigh hose 170 includes a connector 172 to connect to the valve body assembly 44, a right side connector 174 to connect to the fitting 184 for right side thigh cuff 180, a left side connector 175 to connect to the fitting 186 for left side thigh cuff 181. The thigh hose 170 divides into two separate but equal side hose units, the right side thigh hose 176 and the left side thigh hose 177. The hose 170 is secured to connectors 172,174,175. The connectors can be of a variety of types known to those of skill in the art, such as but not limited to a polymer quick-connect connector. The right side thigh cuff 180 and the left side thigh cuff 181 can be any cuffs known to those of skill in the art for use in an external counter pulsation system. For example, the thigh cuffs 180,181 can be approximately 55 cm long by 30 cm wide. The thigh cuffs 180,181 can be formed from of a material that can withstand pressure, such materials are known to those of skill in the art. Some examples include synthetic fabrics such as nylon. The thigh cuffs 180,181 include right side bladder connector 182 and left side bladder connector 183. The thigh cuffs 180,181 include straps 184 that are stitched to thigh cuffs 180, 181. The straps 184 can be formed of the same material as thigh cuffs 180, 181. The thigh cuffs 180,181 include an inflatable bladder 185 connected to right side bladder connector 182 and left side bladder connector 183. The thigh cuffs 180,181 include hook fastener pads 186 and loop fastener pads 187 for securing and maintaining the thigh cuffs 180,182 about the thighs of a patient. The hook fastener pads 186 and loop fastener pads 187 can be formed of a material that can withstand pressure, such materials are known to those of skill in the art. Examples of such materials include synthetic materials such as nylon.

A buttocks hose 190 is used to connect the system 10 to the buttocks cuff 200. The buttocks hose 190 is of a sufficient length as to enable attachment of the buttocks cuff 200 to the system 10 without causing the system to move unintentionally, preferably at least 3.8 cm in diameter and approximately 1.5 m long. The buttocks hose 190 includes a connector 192 to connect to the valve body assembly 44, a right side connector 194 to connect to the right side fitting 201 for bladder 203 a left side connector 195 to connect to the left side fitting 202 for bladder 203. The buttocks hose 190 divides into two separate but equal side hose units, a right side buttock hose 196 and a left side buttocks hose 197. The buttocks hose 190 can be formed of a material that can withstand pressure, such materials are known to those of skill in the art. Some examples of materials include polymers. The hose 190 is secured to the connectors 192,194, 195. The connectors 192,194,195 can be of a variety of types known to those of skill in the art, such as but not limited to a polymer quick-connect connector. The buttocks cuff 200 includes a right side bladder connector 201 and a left side bladder connector 202 that are each connected to an inflatable bladder 203 contained within the buttocks cuff 200. The buttocks cuffs 200 can be formed from of a material that can withstand pressure, such materials are known to those of skill in the art. Some examples include synthetic fabrics such as nylon. The buttocks cuff 200 includes a pair of straps 204 with hook fastener pads 205 and loop fastener pads 206 for securing and maintaining the buttocks cuffs 200 about the buttocks of a patient. The hook fastener pads 205 and loop fastener pads 206 can be formed of a material that can withstand pressure, such materials are known to those of skill in the art. The hook fastener pads 205 and loop fastener pads 206 can be formed of a material that can withstand pressure, such materials are known to those of skill in the art. Examples of such materials include synthetic materials such as nylon.

The system 10 of the present invention allows an operator to quickly conform the system 10 for patient treatment. The input devices of the system 10, such as a display 30 with touchscreen capability or a keyboard 31 easily allow an operator to enter patient information and adjust and customize the system treatment. The system 10 includes a number of output devices, such as a display 30 with touchscreen capability, speaker integrated into controller 46, or illuminated controls 47 allow an operator to receive information about system operation and patient conditions. The system 10 allows for patient information to be stored electronically for future treatments or purposes or analysis.

The system 10 of the present invention also includes a controller 46 for controlling the operation of system 10. The controller 46 includes a computer 45 and display 30. The controller 46 is mounted using fasteners such as screws to the interior of housing frame 12 and display 30 is mounted to display stand 33 to the housing frame 12. The controller 46 receives data from the system 10 and uses software to interpret and display patient data on display 30. The software includes algorithms to process data received from the various components of the system 10 and the patient. More specifically, the controller 46 receives ECG electrical signals from the patient by measuring the electrical conductivity of the heart and capturing the electrical impulses generated by the polarization and depolarization of cardiac tissue using the electrode 220 and the lead 222. The controller 46 translates the electrical conductivity information into a waveform. The waveform is then used by the system 10 to measure the rate and regularity of the heartbeat of the patient. A number of electrodes 220 such as Kendall BioTac™ Ag/AgCl, Ref. 22733 (Covidien Ltd., Mansfield, Mass. USA), teardrop-shaped foam pre-gelled electrodes or similar can be used and placed upon the chest in the vicinity of the heart of the patient. The electrodes 220 are connected to leads 222 that are also connected to the controller 46 within the system 10. The ECG of the patient is measured and the controller 46 of system 10 uses this information to coordinate the inflation and deflation of the cuffs 160,162, 180,182,200 secured to the patient.

The controller 46 uses a fingertip-type plethysmograph (pulse oximeter) sensor 240 to generate an electrical signal that correlates with the arterial blood pressure pulse wave of the patient. The signal is sent via lead 242 to controller 46. The controller 46 also controls the operation of the air pressure adjustment module (APAM) 42 and valve body assembly (VBA) 46. The controller 46 adjusts the position of plunger 64 of the APAM 42 to regulate the pressure supplied from the tank 34 to cuffs 160,162,180,182,200. The controller 46 also adjusts the APAM 42 in response to user input. The controller 46 interprets data obtained by the electrodes 220 and pulse oximeter 240 attached to the patient and sends signals to the intake 86, exhaust 88 and vent valve solenoids 110 coordinating their operation. The controller 46 directs each intake valve solenoid 86 to open sequentially, inflating the cuffs 160,162,180,182,200 secured to the patient during the diastole of the heartbeat. At the end of the diastole, the controller 46 directs each intake valve solenoid 86 to close simultaneously and each exhaust valve solenoid 88 to open simultaneously, with venting to the atmosphere. After the pressure is released from the cuffs 160,162,180,182,200 and hoses 150,170,190 the controller 46 directs each exhaust valve solenoid 88 to close and a treatment cycle is complete. The vent valve solenoids 110 are opened by the controller 46 at the conclusion of treatment.

The system 10 also includes power supply 48 electrically connected to the system 10. The power supply 48 provides electrical power to the components of the system 10 during operation. The power supply 48 can be of a variety of types such as a medical grade power supply generally used in medical devices as are known to those of skill in the art. The power supply 48 can accept a variety of input or mains power, such as 120 VAC 60 Hz or 230 VAC 50 Hz. The power supply 48 can further include a transformer to convert mains power to output power such as 24V or 48V.

Other aspects, embodiments, and advantages of these exemplary aspects and embodiments are discussed in detail below. This description provides illustrative examples of various aspects and embodiments of the present invention, and is intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the specification, serve to explain the described and claimed aspects and embodiments.

The invention has been described in an illustrative manner, and it is to be understood that the terminology, which has been used herein, is intended to be in the nature of words of description rather than of limitation.

Obviously, many modifications and variations of the present invention are possible in light of the above teachings. It is, therefore, to be understood that within the scope of the described invention, the invention can be practiced otherwise than as specifically described.

What is claimed is:

1. A portable oscillating compression system comprising:
   an air compressor;
   an accumulator tank attached to said air compressor;
   an air pressure adjustment module attached to said accumulator tank;
   a valve body assembly attached to said accumulator tank, said valve body assembly comprising:
      a first valve body portion comprising:
         at least one intake valve port for receiving at least one intake valve solenoid, said at least intake valve solenoid further comprising;
         at least one at least intake valve spring; and
         at least one intake solenoid valve pintle head;
         at least one exhaust valve port for receiving at least one exhaust valve solenoid, said at least one exhaust valve solenoid further comprising:
         at least one at least one exhaust valve spring; and
         at least one exhaust solenoid valve pintle head;
      a second valve body portion including:
         at least one vent valve port for receiving at least one vent valve solenoid, said one vent valve solenoid further including:
         at least one vent valve spring; and
         at least one vent solenoid valve pintle head;
      a valve transfer plate connecting said first valve body portion and said second valve body portion;
      said valve transfer plate having a sealing surface for engaging said at least one intake solenoid valve pintle heads, said at least one intake exhaust solenoid valve pintle heads and said at least one vent solenoid valve pintle head;
   a plurality of inflatable cuffs connected to said valve body assembly for receiving the compressed air from said valve body assembly;
   at least one controller for controlling said valve body assembly;
   a power supply; and
   a housing.

2. The portable oscillating compression system of claim 1, wherein said first valve body portion further includes three pairs of intake solenoid actuators electrically connected to said controller.

3. The portable oscillating compression system of claim 1, wherein said second valve body portion further includes three vent solenoid actuators electrically connected to said controller.

4. The portable oscillating compression system of claim 1, wherein said valve body assembly further includes at least one silencer fluidly connected to said second valve body portion.

5. The portable oscillating compression system of claim 1, wherein said first valve body portion further includes at least one silencer fluidly connected to said first valve body portion.

6. The portable oscillating compression system of claim 1 wherein said air pressure adjustment module comprises:
- a motor comprising an output shaft;
- an axle secured to said output shaft of said motor;
- a pressure valve body secured to said motor;
- a pressure valve bushing, said pressure valve bushing secured to said axle;
- a compression spring disposed with said valve body; and
- a plunger.

7. The portable oscillating compression system of claim 1 where the at least one accumulator tank holds at least 12 liters of air.

* * * * *